United States Patent [19]

Claycomb

[11] 4,377,177

[45] Mar. 22, 1983

[54] THROTTLING MUD CHOKE APPARATUS

[76] Inventor: Jack R. Claycomb, 8226 Wayremer, Houston, Tex. 77040

[21] Appl. No.: 261,961

[22] Filed: May 8, 1981

Related U.S. Application Data

[60] Division of Ser. No. 30,473, Apr. 16, 1979, Pat. No. 4,281,678, which is a continuation-in-part of Ser. No. 727,031, Sep. 27, 1976, Pat. No. 4,190,073.

[51] Int. Cl.³ .................. B08B 3/00; F16K 47/04
[52] U.S. Cl. .................. 137/15; 137/238; 138/45; 166/91; 175/218; 251/122; 251/333
[58] Field of Search .......... 137/15, 238, 489; 166/91, 97, 320; 175/38, 218; 251/63, 210, 35, 324, 333, 121, 122, 205; 138/45

[56] References Cited

U.S. PATENT DOCUMENTS

| | | | |
|---|---|---|---|
| 271,073 | 1/1883 | Jenkins | 251/333 |
| 1,831,713 | 11/1931 | Knowlton | 251/333 |
| 1,911,905 | 5/1933 | Knowlton et al. | 251/122 |
| 2,004,423 | 6/1935 | Warren | 251/333 |
| 2,014,314 | 9/1935 | Defenbaugh | 251/122 |
| 2,132,199 | 10/1938 | Yancey | 166/91 |
| 3,598,145 | 8/1971 | Wolfson | 251/333 |
| 3,620,251 | 11/1971 | Bowen | 251/333 |
| 3,693,732 | 9/1972 | Sabi | 175/38 |
| 3,703,908 | 11/1972 | Tellier | 251/333 |
| 4,044,834 | 8/1977 | Perkins | 175/38 |

FOREIGN PATENT DOCUMENTS

| | | | |
|---|---|---|---|
| 25965 | 10/1906 | Fed. Rep. of Germany | 251/333 |
| 1121298 | 7/1956 | France | 251/333 |

Primary Examiner—George L. Walton
Attorney, Agent, or Firm—Gunn, Lee & Jackson

[57] ABSTRACT

Mud choke apparatus is disclosed, and the preferred embodiment has the form of a hollow, tubular body receiving a mud flow introduced from a lateral port, the flow being directed through an axial passage and past a valve seat. The valve seat is a replaceable, hardened metal liner and is formed with a gradual taper so that the mud flows from the large end through the tapered, smaller end. Thereafter, it flows out of the body through an axial opening. The flow of mud is throttled by a tapered, hardened plug serving as a valve element which is received into the valve seat. A hydraulic cylinder and piston with a connecting rod move the plug. The plug has a surrounding, perpendicular shoulder which seals and seats against a shoulder on the insert to fully close the throttling valve apparatus. Flow is choked by inserting the tapered plug with controlled clearance into the tapered valve seat.

2 Claims, 3 Drawing Figures

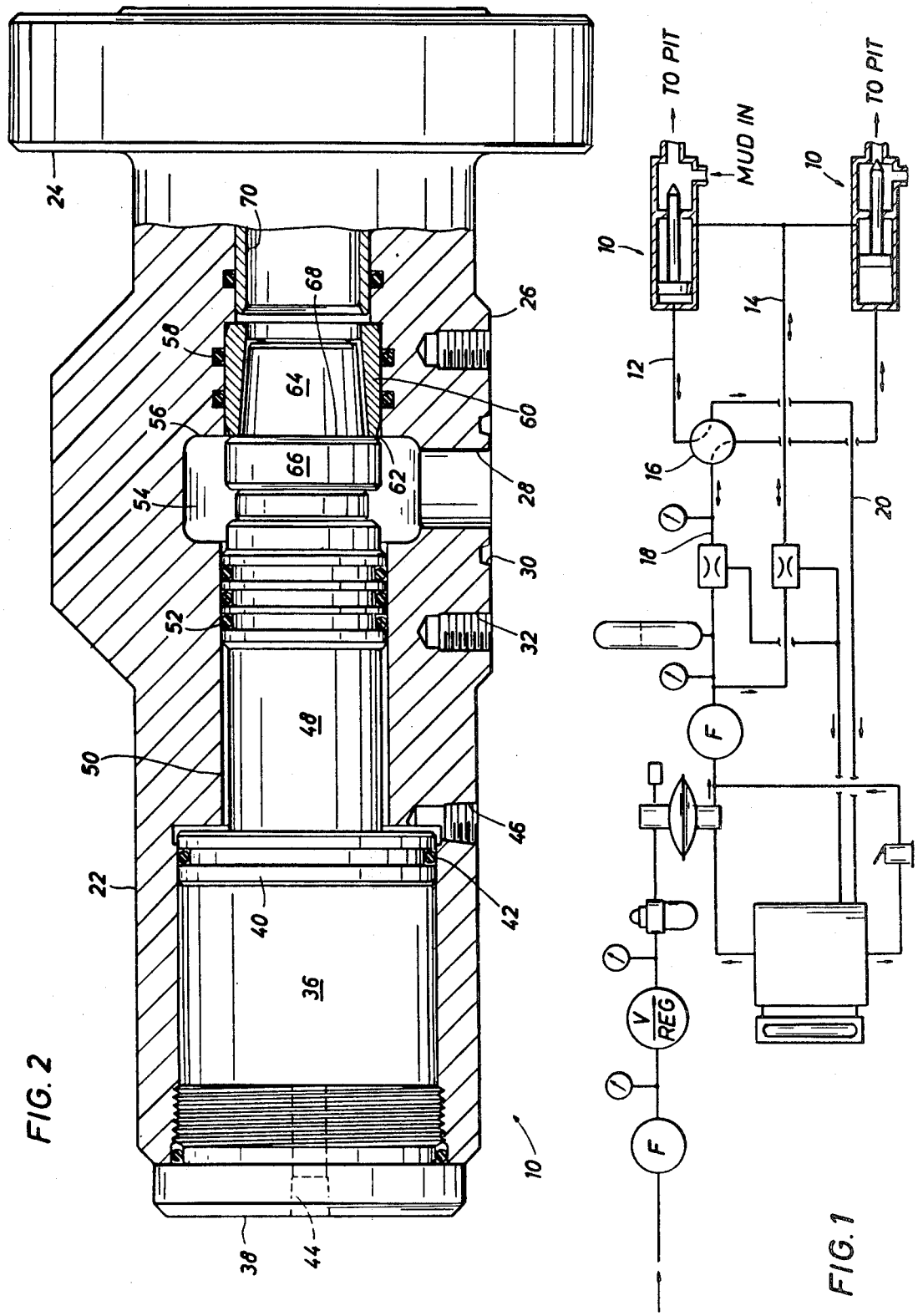

THROTTLING MUD CHOKE APPARATUS

This is a division of application Ser. No. 030,473, filed Apr. 16, 1979, now U.S. Pat. No. 4,281,678 which in turn is a continuation-in-part of application Ser. No. 727,031, filed Sep. 27, 1976, now U.S. Pat. No. 4,190,073, and further relates to application Ser. No. 018,508, filed Mar. 8, 1979, by the same inventor, now U.S. Pat. No. 4,257,442.

BACKGROUND OF THE DISCLOSURE

As set forth in that application, oil well drilling techniques require recirculation of drilling mud. The mud that is normally used in the drilling process serves as a lubricant for the drill bit, washing away cuttings as the bit progresses through the earth and carrying the cuttings in a suspended form back to the surface. The drilling mud is made of a number of products which include abrasive materials and is relatively heavy or thick. Being laden with a number of particles and under substantial pressure, drilling mud very often cuts valves and valve seats of control valves interposed in the mud flow system. The present invention is a flow control choke for use in a mud system. In particular, it is a flow control choke which is interposed downstream from the pump before the mud is delivered to the mud pits to control the back pressure in the drill string, itself, and to control the rate of delivery of mud to the mud pits.

Various and sundry approaches have been used to the fabrication of drilling mud flow control chokes or valves. The present apparatus is deemed to be an improvement over known structures in that it offers an adjustably positioned, tapered plug cooperating with a tapered seat, both of the members being formed of a hardened material. It has the feature of fitting the tapered plug into the tapered seat without contact against the sidewalls. Moreover, the throttling surface is not the surface that provides actual closure in the event that the valve is fully closed. Perpendicular shoulders upstream from the tapered surfaces serve this purpose, yielding the advantage that flow through the tapered plug and seat does not require full closure thereof on the stream and the consequential erosion that occurs in routine operation. The apparatus is exposed to mud flow heavily laden with particles which might damage, harm or otherwise destroy the equipment. The surfaces which provide the throttling effect, therefore, serve only that purpose, while the valve and seat surfaces which provide full shutoff do not serve dual purposes.

One advantage of the present invention is thus the ability of the apparatus to provide continual throttling to mud flow with surfaces which are never required to contact one another. This prevents closure of these surfaces against one another with the consequential damage that occurs should particulate cuttings be trapped between them. They close toward one another to achieve the throttling so attractive in the present invention, but they do not contact. Moreover, these surfaces are concentric to one another so that, at a given spacing or throttling position, the flow is controlled even though the plug serving as a valve may be partly worn away. Erosion of the components must be excessive and substantially total before it actually modifies the gap or spacing through the throttling flow controller.

BRIEF SUMMARY OF THE DISCLOSED APPARATUS

This disclosure reveals an improved throttling mud flow choke apparatus comprising an elongate, hollow body having a lateral passage where mud is introduced into a central, axial passage. The central, axial passage incorporates a removable valve seat having the form of an internally tapered sleeve. It is made of hardened material and is replaceable because it tends to wear rapidly. The apparatus further includes a valve element which has the form of a tapered plug. The plug and seat taper at the same angle so that they can fit concentric to one another. The plug is mounted so that it will enter the seat but not contact the valve seat. Maximum penetration is limited by shoulders which are perpendicular to the axis of the plug, one shoulder on the plug facing the end shoulder of the valve seat. The valve element is carried on an elongate piston rod guided by seals and a bored passage within the valve body, the piston rod extending to a hydraulic piston and cylinder arrangement for actuation.

BRIEF DESCRIPTION OF THE DRAWINGS

FIG. 1 is a schematic control system and improved throttling valve of the present invention;

FIG. 2 is a sectional view through the improved throttling mud valve of the present invention.

DETAILED DESCRIPTION OF THE DISCLOSED EMBODIMENT

Figure 3:
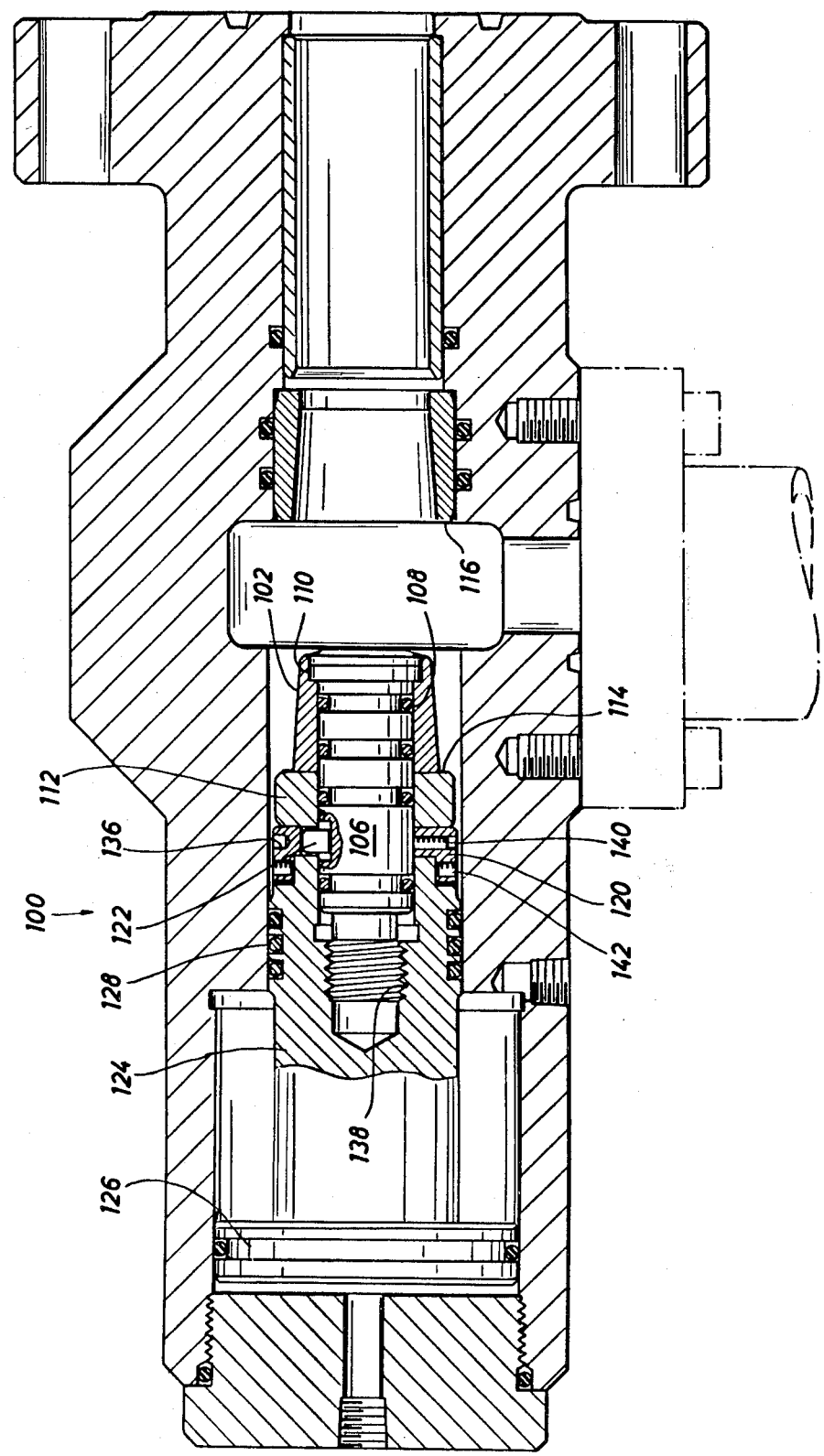
FIG. 3 is a sectional view through an alternate form of the improved throttling mud valve of the present invention particularly illustrating details of construction which assist in assembly of the apparatus.

Attention is first directed to FIG. 1 of the drawings, where the present invention is shown along with the control apparatus for it. The mud control valve is generally identified with the numeral 10 and is typically installed in a duplex arrangement so that two of them are connected with a common control system. In the event that one fails catastrophically, the other can be used while the first is being serviced or removed from service. The mud throttling valve of the present invention is operated by hydraulic fluid under pressure. A double-acting arrangement is preferably used so that it is powered to close and also powered to open. That is to say, positive control is achieved with a double-acting system. To this end, the apparatus incorporates a fluid line 12 which delivers hydraulic fluid under pressure for the purpose of closing the choke 10. A line 14 is connected to the choke 10 for opening the choke. The lines 12 and 14 are connected on opposite sides of a hydraulic piston arranged in a cylinder which moves a push rod, all as symbolized in FIG. 1. The representation of the choke 10 in FIG. 1 is somewhat schematic insofar as the choke is concerned. FIG. 2 shows greater details. Briefly, a four-port, two-way valve 16 controls pressure introduced to the control lines 12 and 14. It will be observed that the valve 16 provides high pressure to one choke or the other. When one is operated to the throttling position, pressure at the other is reduced to enable it to move to the full open position. To this end, the two-way valve 16 connects to a high pressure line 18 which provides the input for the two chokes. The valve 16 also directs hydraulic fluid flow through a line 20 which returns to a sump. The remainder of the hydraulic system shown in FIG. 1 is for the purpose of adjusting the pressure so that closure is achieved. It will be further noted that the line 14 provides hydraulic fluid at an intermediate level which forces both chokes 10 full open in the event the high pressure is reduced or switched by the valve 16.

Attention is directed to FIG. 2 of the drawings, where a choke 10 is shown in greater detail. It incorporates an elongate, cylindrical body 22 which terminates at a flange 24 which enables it to be connected to a mud line. An inlet is provided at a circular, flat face 26, the flat face centering around an inlet passage 28. A groove 30 serves as receptacle for a ring seal, and a set of threaded bolt holes is also arranged on the face 26. Threaded bolts are positioned in the tapped holes at 32.

The elongate body terminates at a cylindrical cavity 36. The cavity 36 is closed by a threaded plug 38. The plug 38 is joined to the body to seal the chamber 36. The cylindrical chamber 36 encloses a piston 40 which fits snugly within the chamber to prevent blowby and is provided with a seal ring 42 around its periphery. Hydraulic oil under pressure is introduced through one opening at 44 and acts on one face of the piston 40. The opposite side of the piston 40 is exposed to hydraulic fluid introduced through a tapped opening 46. The tapped opening 44 is adapted to be connected to the hydraulic line 12, while the line 14 connects to the tapped opening 46. These two openings are arranged on opposite sides of the piston. It will be observed that travel of the piston is limited so that it does not bottom out before reaching the end of travel shown in FIG. 2. FIG. 2 shows the maximum range of movement to the right. The piston can move to the left, the range of movement being limited by contact of the piston 40 against the plug 38.

The piston 40 centrally connects to a piston rod 48 which is aligned in an axially centered passage 50. The passage 50 is larger than the piston rod 48, permitting the rod 48 to move freely in the passage 50. The piston rod 48 supports a number of external grooves extending about its periphery which receive and support O-ring seals 52. The number of seals is subject to variation, depending on pressures of the mud and hydraulic pressures in the choke. The seal rings isolate hydraulic fluid on the left of FIG. 2, while drilling mud is on the right of the rings. It is highly undesirable that drilling mud be comingled with the hydraulic fluid used in the system. The seal rings thus wipe the axial passage 50 clean and prevent leakage past the seals.

The lateral opening 28 opens into an enlarged, doughnut-shaped cavity 54 which is concentric with the piston rod passage 50. It is enlarged to provide a larger flow area. It terminates at a shoulder 56 which, in turn, centers about an axial passage extending to the end of the apparatus through the flange 24. The axial passage is internally grooved to receive seal rings 58 which are on the exterior of a tapered, sacrificial sleeve 60. The sleeve is hollow and is internally tapered, having a large left-hand end and tapering to a smaller right-hand end. The sleeve 60 is formed of hardened metal to define a wear-resistant valve seat. It additionally includes an upstream, perpendicular, facing shoulder 62 which is perpendicular to the flow of drilling mud and is chamfered around its outer edge. The shoulder 62 encircles the valve choke element which is identified by the numeral 64 and has the form of a tapered, solid plug which inserts into the valve seat. The facing shoulder 62 seats against a protruding, circular enlargement 66 which faces and abuts the shoulder 62. The plug 64 has an external face with an angle tapering at the same angle as the internal face of the insert or sleeve 60. The valve element 64 substantially penetrates into the valve seat, proper. It penetrates, and, as it does, the gap between the two closes to a specified minimum such as 0.005 inches clearance, the clearance existing fully around the plug. The plug 64 is formed of hardened material. Ideally, the plug and the valve seat are polished and ground to a relatively smooth surface. The two members are made of a hardened material, such as tungsten carbide particles embedded in a supportive matrix. The angle of taper is in the range of 0.5 degrees to 12.0 degrees, ideally 1.0 degrees.

The valve body includes a protruding, circular enlargement 66 which has a shoulder 68 which faces and abuts the shoulder 62. The shoulder 68 terminates at a chamfered surface around the exterior. The enlargement 66 is shown in the cavity 54, the cavity being substantially larger so that mud may flow all around the enlargement 66. The enlargement 66 is supported on an elongate, cylindrical extension of the piston rod 48. The valve element is thus carried on the piston rod 48. It will be observed that the piston rod extends along the axis of the tool from the piston 40 toward the valve seat 60. It has a stroke which carries the plug valve element to the fully closed position of FIG. 2 to the left in a retracted position whereby retraction pulls the plug from the valve seat. Travel to the left is limited by the stroke of the piston 40. It will be further observed that the enlargement 66 is sized to pass into the axial passage 50.

The valve seat 60 is a removable and insertable sleeve which terminates by directing fluid flow into a centrally located, tubular insert 70. This is a wear sleeve having the form of right cylindrical construction and extending toward the face of the flange structure. This completes the exit passage for the mud flow after it has been choked. Again, the sleeve 70 is removable so that it can be replaced as required.

Operation of the device should be considered carefully, which description brings out certain features of the present invention. When the apparatus is installed, and presuming that an appropriate hydraulic connection is made to the fittings 44 and 46 shown in FIG. 2, the piston 40 is moved to and fro in the chamber 36 by the introduction of hydraulic fluid on one side or the other of the piston. As the piston moves to and fro, the piston rod 48 is moved. Movement of the rod 48 is conveyed through the valve element 64 which has the preferred form of a tapered plug. As the plug is moved to the left in FIG. 2, the gap between the plug 64 and the sleeve 60 is increased. This opens the choke 10 of the present invention to an increased flow of mud. As it moves further to the left, some maximum rate of flow is approached. This is the rate of flow which is achieved on maximum opening of the plug 64 from the tapered valve seat 60.

Throttling of the plug 64 in the tapered valve seat 60 is important to the operation of the present invention and is achieved by insertion of the tapered plug into the tapered sleeve, thereby narrowing the gap. It will be understood that the gap has the form of a concentric passage around the plug. Mud flows through the concentric passage at a rate which is dependent, in large part, on the width of the gap or opening.

Throttling of the mud flow is achieved by controlling the width of the gap. The gap can be increased to increase the rate of flow. Conversely, it can be decreased to decrease the rate of flow. As the gap is reduced, the rate of flow is reduced, and the enlargement 66 is brought closer to the removable sleeve 60. When closure is desired, the facing shoulders 62 and 68 are contacted against one another. Moreover, contact of the shoulders 62 and 68 closes the choke 10 completely against further flow of mud. When full closure is achieved, no throttling action occurs in the gap because the upstream shoulders 62 and 68 prevent mud flow into the gap. The facing shoulders 62 and 68 are perpendicular to the direction of flow which is axially of the choke 10. It will be further noted that the direction of flow carries the mud from the enlarged cavity 54, between the facing, perpendicular shoulders 62 and 68 and then into the gap area around the plug 64. It is highly desirable that the enlargement 66 be formed of hardened material in the same manner as the tapered plug 64. Through the use of the hardened material, the life of the apparatus is extended.

The present invention yields the advantage that the tapered valve and valve seat combination limit flow dependent on the width of the gap. As mentioned earlier, the gap can be narrowed as closure is made, but it does not close to zero which would be achieved by contact of the plug with the valve seat. Movement to the right is limited as depicted in FIG. 2 of the drawings.

The arrangement of the present apparatus with the upstream perpendicular shoulders and the downstream tapered surfaces is notable. This prevents the capture of particulate material in the gap area. It is relatively easy to imagine how a particle of a certain size located in the gap at the time of closure can be pinched between the plug and sleeve. Preferably, the size of the gap so relates to the gap which is achieved momentarily between the shoulders 62 and 68 at the time of closure so that particles of a size to be of concern are not admitted to the gap area adjacent to the plug 64 as the perpendicular shoulders close to one another. In other words, closure of the perpendicular shoulders prior to cutoff of flow through the choke 10 prevents the intrusion of particles above a specified size. This size is related to the gap downstream of the perpendicular shoulders. Imagine, for purposes of illustration, that the gap between perpendicular shoulders 62 and 68 is approximately 0.005 inches at which instant the gap around the plug is larger so that particles which do pass through the perpendicular shoulders are inevitably washed through the equipment. Conversely, those that do not flow past the perpendicular shoulders do not become a source of interference downstream in the gap around the plug body proper.

On opening, the plug 64 travels to the left as viewed in FIG. 2. When opened from a fully closed position, the gap around the plug inevitably increases as the plug is retracted.

The present apparatus can be serviced by periodic removal and replacement of the sleeve 60 and the plug 64. This will depend, in part, on the rate of wear of the components. The rate of wear, in turn, is dependent on the pressure across the choke 10, the rate of flow through the choke, the pressure on the mud, the extent that particulate abrasive materials are entrained in the mud and other factors relating to the operation of the apparatus.

The device can be used in a variety of circumstances, including variations of the flow rate by using a very thick wall valve seat and a smaller plug. Conversely, flow capacity can be increased by using smaller or thinner walled inserts and larger plugs.

FIG. 3 of the drawings shows a construction which is very similar to that shown in FIG. 2. The mud control valve 10 of FIG. 2 illustrates in ample detail how the mud control valve of FIG. 3 operates. Accordingly, the operation of the valve 100 will be omitted because the components which comprise the valve element and valve seat remain the same. There are several differences worth noting which are amply illustrated in FIG. 3. The embodiment in FIG. 3 is referred to generally as the mud control valve 100.

The mud control valve 100 incorporates a tapered, plug-like member 102 formed of a hardened material and terminating at an end cap 104. The cap 104 is spot brazed to an elongate rod 106 which has suitable grooves at various locations to receive O-rings 108. The grooves and O-rings form seals so that the drilling fluid does not leak beneath the tapered sleeve 102.

The numeral 110 identifies an enlarged, protruding shoulder at the end of the elongate, rod-like member 106. The shoulder locks against the sleeve 102 which is inserted from left to right as viewed in FIG. 3 to assemble the apparatus. Thereafter, a larger ring-like member 112 is next positioned around the rod 106 to position the perpendicular shoulder 114 for seating against the shoulder 116. This is where closure actually occurs when the mud control valve 100 is fully closed. On throttling action, the shoulders 114 and 116 are positioned parallel to one another and are spaced by a distance suitable to enable the tapered plug to operate in the tapered valve seat in the same manner as described relative to FIG. 2 of the drawings. Again, the member 112 is moved from left to right over the rod 106 in assembling the equipment.

The numeral 120 identifies a lock ring which is next positioned over the rod 106. A key 122 is inserted into a slot to be described. Then, the rod 106 is threaded into the cylindrical piston rod 124 which connects to the piston 126, enabling movement to be transferred to operate the mud control valve 100 via hydraulic pressure applied to the piston 126. Ideally, the piston is arranged in the cylinder with suitable connections to make a double-acting system. Lengthwise movement is coupled from the piston through the assembled structure to thereby position the tapered plug in the tapered seat in the manner described before. It will be observed that suitable O-rings 128 prevent leakage along the exterior so that drilling mud is isolated from hydraulic fluid near the piston 126.

Assembly of the equipment is very important. Disassembly and field service are equally important. Components 102 and 112 tend to wear away, and it is necessary to periodically replace them. Field disassembly, therefore, enables the present invention to be quickly repaired after the expected wear has occurred. The wear is occasioned by drilling mud which, of course, is very abrasive. The abrasive mud impinges on the two components suffering the most exposure and will wear them away so that replacement is inevitably required. Field assembly, while being important, cannot be made so easy that the components become unthreaded due to vibration acting on the equipment. Catastrophic failures have occurred as a result of vibration. The extreme vibration found in the environment can, indeed, back threaded members off so that unthreading inadvertently occurs. This is prevented by the lock mechanism shown in FIG. 3.

The lock mechanism shown in FIG. 3 utilizes a key slot in the rod 106 to receive the key 122. The key may have a span of perhaps 10.0 or 15.0 degrees, referring to the circumference of the rod 106. Accordingly, the key slot is made to that width with sufficient room to spare so that the key 122 can be easily inserted. The key, when inserted, locks the ring 120 against rotation. In other words, the ring 120 is free to rotate if the key 122 is omitted. It fits somewhat loosely around the rod 106. However, its loose connection is merely a convenience to assembly so that it can be readily rotated. It incorporates a pair of oppositely located drilled holes 136 which are sized and spaced to be used with a spanner wrench. The spanner wrench imparts rotation to the ring 120 which, in turn, rotates the rod 106 to make it up at the threads 138. The threads 138 are torqued to a required tightness. Thereafter, the ring 120 is locked in position by utilizing a set screw 140 which keeps it from rattling around the rod 106. Additionally, another set screw at 142 lock it on the protruding shoulder which surrounds the rod 106. The set screws serve the purpose of holding the ring stationary. They do not transmit torque when the ring is being rotated. More accurately, they hold the ring so that it will not wiggle and jiggle during use. Their hold on the ring assists in prevention of unthreading.

The assembly procedure thus taught in FIG. 3 particularly features the threading of the ring 120 coupled through the key 122 to make up the threads at 138. The threads 138 must be torqued to a fairly severe standard; otherwise, vibration may unthread the apparatus at 138. If this were to occur, the valve might lock shut. Moreover, if it occurs after some wear has impacted the equipment, unthreading, coupled with the wear, may cause portions of the equipment to break, and pieces of the plug assembly might easily flow downstream. This kind of catastrophic failure is prevented by the connective mechanism shown in FIG. 3. Moreover, it is a mechanism which enables field assembly and disassembly. For instance, in the field, the mud control valve 100 is repaired by replacing the worn parts quickly and easily. The equipment shown in FIG. 3 is disassembled from the left-hand end to remove the rod 106 which is unthreaded utilizing a spanner wrench affixed to the ring 120. The parts 102 and 112 can thereafter be replaced. They are particularly the parts which require servicing because they are exposed to maximum wear. In other regards, the mud control valve 100 functions in the same manner as the mud control valve 10 shown in FIG. 2.

While the foregoing is directed to the preferred embodiment, the scope thereof is determined by the claims which follow.

I claim:

1. A method of controlling drilling mud flow in a drilling mudchoke which includes:
   a hollow valve body having a passage therethrough;
   a valve seat having an encircling, tapered face surrounding an axial passage for directing mud flow past said tapered face and along said passage within said valve body;
   an encircling circular valve seat shoulder in a plane perpendicular to the flow through said axial passage which shoulder defines an upstream located closure face cooperatively positioned relative to said valve seat tapered face;
   a valve element having an external tapered face conforming to said valve seat tapered face wherein said valve element, on movement, moves into a concentric, centrally positioned throttling location within said valve seat opposite said valve seat tapered face and wherein said valve element and said valve seat tapered faces define a gap therebetween for throttling mud flow passing through the gap, and wherein said valve element controllably blocks the axial passage flow of mud past said valve seat;
   said valve element and said valve seat tapered faces are defined by straight line segments in axial section;
   a surrounding circular shoulder on said valve element which shoulder is adapted to conform to and seat against said valve seat shoulder to plug and close the flow of mud through the gap between said valve element and said valve seat, wherein said valve element and valve seat define a minimum gap at closure of said valve element relative to said valve seat;
   means for moving said valve element into a fully closed position relative to said valve seat;
   inlet and outlet means communicating with said passage through said valve body; and
   wherein the method includes the steps of:
   (a) positioning the valve element in the hollow valve body and spaced from the valve seat such that the encircling circular valve seat shoulder and the surrounding shoulder on the valve element are facing one another and moved toward or away from one another on movement of the valve element in the valve body and such movement varies the volume of mud flowing therepast;
   (b) further positioning the valve element in the valve seat to enable the tapered face of the valve element to move into a throttling position relative to the encircling tapered face of the valve seat between first and second throttling locations relative to the valve seat to define a gap therebetween wherein mud flow between the tapered faces in the gap is reduced in the second throttling position as the gap is narrowed on movement;
   (c) defining a flow path from the inlet means of the hollow valve body and then between the encircling and facing circular shoulders, and which flow path then flows through the gap defined by the valve element and valve seat facing tapered faces, and thereafter extending along the passage to the outlet means;
   (d) selectively closing the upstream encircling and facing circular shoulders fully to interrupt mud flow therepast; and
   (e) wherein the step of closing the upstream encircling and facing circular shoulders creates a cleaning and flushing flow effect which prevents particles of a certain size in the drilling mud from flowing through the gap.

2. The method of claim 1 further including the step of closing the facing and encircling circular shoulders against one another to create said cleaning and flushing flow thereacross to remove particles below a specified size in the mud flow from between the shoulders so that such particles are not caught between the shoulders at closure, and further including the step of excluding particles larger than the specified size from entry into the space between the shoulders during closing so that the valve element may close toward the valve seat without closing on particles susceptible of causing damage to the tapered faces.

* * * * *